US012429201B2

(12) United States Patent
Ljunggren et al.

(10) Patent No.: US 12,429,201 B2
(45) Date of Patent: Sep. 30, 2025

(54) HEADLAMP INTEGRATED INTO A FLEXIBLE COMPOSITE HEADBAND

(71) Applicant: BioLite, Inc., Brooklyn, NY (US)

(72) Inventors: Anton Olof Ljunggren, New York, NY (US); Andrew Laska, Brooklyn, NY (US); Jonathan N. Cedar, Brooklyn, NY (US); Melinda Abbruzzi, Brooklyn, NY (US); David Ryan Gist, Brooklyn, NY (US)

(73) Assignee: BioLite, Inc., Brooklyn, NY (US)

( * ) Notice: Subject to any disclaimer, the term of this patent is extended or adjusted under 35 U.S.C. 154(b) by 0 days.

(21) Appl. No.: 18/761,195

(22) Filed: Jul. 1, 2024

(65) Prior Publication Data

US 2025/0035293 A1 Jan. 30, 2025

Related U.S. Application Data

(63) Continuation of application No. 17/967,132, filed on Oct. 17, 2022, now Pat. No. 12,025,297, which is a continuation of application No. 16/015,050, filed on Jun. 21, 2018, now Pat. No. 11,473,761.

(51) Int. Cl.

| | |
|---|---|
| ***F21V 21/00*** | (2006.01) |
| ***F21L 4/04*** | (2006.01) |
| ***F21V 21/084*** | (2006.01) |
| ***F21V 21/14*** | (2006.01) |

(Continued)

(52) U.S. Cl.
CPC .............. *F21V 21/145* (2013.01); *F21L 4/04* (2013.01); *F21V 21/084* (2013.01); *F21V 23/0428* (2013.01); *F21Y 2115/10* (2016.08)

(58) Field of Classification Search
CPC ...... F21L 4/04; F21V 23/0428; F21V 21/145; F21V 21/084
See application file for complete search history.

(56) References Cited

U.S. PATENT DOCUMENTS

| | | |
|---|---|---|
| 3,947,676 A | 3/1976 | Battilana |
| D266,712 S | 11/1982 | Van Valkenburgh |
| 4,797,793 A | 1/1989 | Fields |

(Continued)

FOREIGN PATENT DOCUMENTS

| | | |
|---|---|---|
| CN | 204017145 U | 12/2014 |
| FR | 2551841 A1 | 3/1985 |

(Continued)

*Primary Examiner* — Gerald J Sufleta, II
(74) *Attorney, Agent, or Firm* — Loginov & Associates, PLLC; William A. Loginov

(57) ABSTRACT

This disclosure provides a portable lamp worn on the head and method of construction for the portable lamp. The construction method forms a composite structure that improves the comfort, reduces the volume, and better distributes the weight of the components of the lamp. The method of construction allows for a flexible material or set of flexible materials to be used to encapsulate the rigid parts of the headlamp. The flexible and rigid materials can be joined together in a heat press process that results in a single composite structure that has both attributes of the rigid material(s) and the flexible material(s) in different areas of the lamp. The battery can be located at the back or otherwise remote from the light to improve weight distribution and comfort for the user.

13 Claims, 9 Drawing Sheets

(51) Int. Cl.
*F21V 23/04* (2006.01)
*F21Y 115/10* (2016.01)

(56) References Cited

U.S. PATENT DOCUMENTS

| | | | |
|---|---|---|---|
| 5,485,358 | A | 1/1996 | Chien |
| 6,575,587 | B2 | 6/2003 | Cramer |
| 6,729,025 | B2 | 5/2004 | Farrell |
| 6,932,487 | B2 | 8/2005 | Aknine |
| D525,734 | S | 7/2006 | Shiao |
| D560,009 | S | 1/2008 | Spartano |
| D583,971 | S | 12/2008 | Castellucci |
| D615,225 | S | 5/2010 | Debrunner |
| D615,678 | S | 5/2010 | Debrunner |
| 8,113,677 | B2 | 2/2012 | Carpenter |
| 8,157,401 | B2 | 4/2012 | Lau |
| D680,250 | S | 4/2013 | Opolka |
| 8,425,072 | B2 | 4/2013 | Hurwitz |
| 8,529,086 | B2 | 9/2013 | Skrivan |
| 8,764,651 | B2 | 7/2014 | Tran |
| D724,248 | S | 3/2015 | Brands |
| D752,258 | S | 3/2016 | Hine |
| D752,261 | S | 3/2016 | Ma |
| D752,791 | S | 3/2016 | Ferguson |
| D754,378 | S | 4/2016 | Feustel |
| D756,552 | S | 5/2016 | Kunzendorf |
| 9,700,087 | B2 | 7/2017 | Tiffin |
| 10,006,349 | B2 | 6/2018 | Luehrsen |
| 10,085,668 | B2 | 10/2018 | Jung |
| 10,156,347 | B2 | 12/2018 | Pontano |
| 10,432,839 | B2 | 10/2019 | Frank |
| 10,757,311 | B2 | 8/2020 | Frank |
| 2003/0117575 | A1 | 6/2003 | Waters |
| 2004/0130888 | A1 | 7/2004 | Twardawski |
| 2007/0217184 | A1 | 9/2007 | Berry |
| 2008/0130272 | A1 | 6/2008 | Waters |
| 2008/0298048 | A1 | 12/2008 | Garrity |
| 2009/0222978 | A1 | 9/2009 | Fang |
| 2012/0195026 | A1 | 8/2012 | Bouffay |
| 2013/0204094 | A1* | 8/2013 | Fiebel .................. A61B 1/0692 600/249 |
| 2013/0301242 | A1 | 11/2013 | Sharrah |
| 2016/0146443 | A1 | 5/2016 | Steiner |
| 2016/0215970 | A1 | 7/2016 | Tiffin |
| 2017/0159898 | A1 | 6/2017 | Urry |
| 2017/0163860 | A1 | 6/2017 | Frank |
| 2017/0211759 | A1 | 7/2017 | Qiu |
| 2018/0209618 | A1 | 7/2018 | Pontano |
| 2018/0216807 | A1 | 8/2018 | Mishan |
| 2020/0029003 | A1 | 1/2020 | Frank |
| 2022/0120418 | A1* | 4/2022 | Gall .......................... F21L 4/04 |

FOREIGN PATENT DOCUMENTS

| | | | |
|---|---|---|---|
| KR | 20160004173 | A | 1/2016 |
| WO | 2005006389 | A2 | 1/2005 |
| WO | 2016196411 | | 12/2016 |

* cited by examiner

HEADLAMP INTEGRATED INTO A FLEXIBLE COMPOSITE HEADBAND

RELATED APPLICATION

This application is a continuation of U.S. patent application Ser. No. 17/967,132, entitled HEADLAMP INTEGRATED INTO A FLEXIBLE COMPOSITE HEADBAND, filed Oct. 17, 2022, which is a continuation of U.S. patent application Ser. No. 16/015,050, entitled HEADLAMP INTEGRATED INTO A FLEXIBLE COMPOSITE HEADBAND, filed Jun. 21, 2018, now U.S. Pat. No. 11,473,761, issued Oct. 18, 2022, the teachings of each of which applications are expressly incorporated herein by reference.

FIELD OF THE INVENTION

The present invention relates generally to portable electric lamps, and more particularly to portable lamps worn on the head. The present invention relates specifically to an apparatus and method of construction that integrates flexible material with the rigid functional parts of the lamp.

BACKGROUND OF THE INVENTION

Portable electric lamps and more specifically wearable headlamps are conventionally comprised of a rigid housing (typically plastic), attached to a flexible head band (typically elastic). The housing, or housings, contain the light emitting element, battery power supply, control electrics, and optical lens(es). In this conventional configuration the housing and its contained components is cantilevered out from the user's forehead. This presents a less than optimal arrangement in terms of comfort, weight distribution, and overall volume. In some embodiments, the housing is broken up into two separate housings, one containing the battery power source and the other containing the light emitting electrics and lens. The weight distribution can be improved using this approach, but the rigid housings are still attached to, rather than integrated inside the flexible band. This results in the weight of the housings being not well supported and pressure points being caused on the users head. Accordingly, it would be desirable to provide a headlamp with improved comfort and weight distribution.

SUMMARY OF THE INVENTION

The present invention overcomes the disadvantages of the prior art by providing a headlamp that incorporates the use of a composite construction to make a more highly integrated and streamlined headlamp that is more comfortable on the head. The weight of the components is better supported and balanced, which makes the headlamp much less noticeable to the wearer. The streamlining of the form also keeps the lamp free from catching on equipment or objects in the environment.

In an embodiment, a wearable electric light with a composite structure and can include a first flexible support member, a second flexible support member, a rigid housing between the first and second flexible members, and an electrical light source with at least one lens housed within the rigid housing, wherein the first and second flexible support members are adhered to the rigid housing and extend beyond the rigid housing forming a composite structure with rigid and flexible regions.

In various embodiments the first and second flexible support members can be made from a flexible polymer, a textile, or other fabric material. The flexible material can be impregnated or coated with an adhesive that can allow the layers of fabric to be joined by application of heat and/or pressure to form the composite structure. The rigid housing can have a foundation, and a frame, and can define a cavity formed by the foundation and the frame, and wherein the first and second flexible support members are adhered to the foundation and sides of the frame, and wherein the support members do not fully cover the cavity. The wearable light can have a brim around a perimeter of the rigid housing. The wearable electric light can include a layer of resilient material between the rigid housing and the first and second flexible support members. The resilient material can be silicone, TPU, or foam polymer. At least one of the flexible support members can extend beyond the rigid housing in a band. The band can include a strap. A battery can be supported by the band remote from the housing. A power cord connecting the battery to the electric light source can be at least partially held between the flexible support members.

A wearable electric light can have a rigid housing defining a cavity and a brim extending around a portion of the perimeter of the rigid housing, a flexible support band having two wings, the flexible support band encapsulating the brim, and the wings extending outward beyond the brim, and a lighting system within the cavity, the lighting system including at least one light source and at least one lens. The two wings can be connected to each other at a location remote from the rigid housing, whereby the flexible support band forms a loop. Two wings can be connected by a strap having at least one buckle. The wearable light can include a layer of resilient material between the rigid housing and the flexible support band. A battery can be supported by the band remote from the rigid housing. A power cord connecting the battery to the electric light source can be at least partially encapsulated within the flexible support band.

A method for constructing a wearable electric light with a composite structure can include placing a rigid housing defining a cavity between first and second layers of flexible material, at least one layer of flexible material having wings that extend outwards beyond the rigid material, and compressing the two layers of flexible material to form a composite structure. The method can include creating a hole in the first layer, and aligning the hole and the cavity so that the first layer of flexible material does not cover the cavity. The method can include inserting a lighting system having at least one light source and at least one lens into the cavity.

BRIEF DESCRIPTION OF THE DRAWINGS

The invention description below refers to the accompanying drawings, of which.

DETAILED DESCRIPTION

Figure 1:
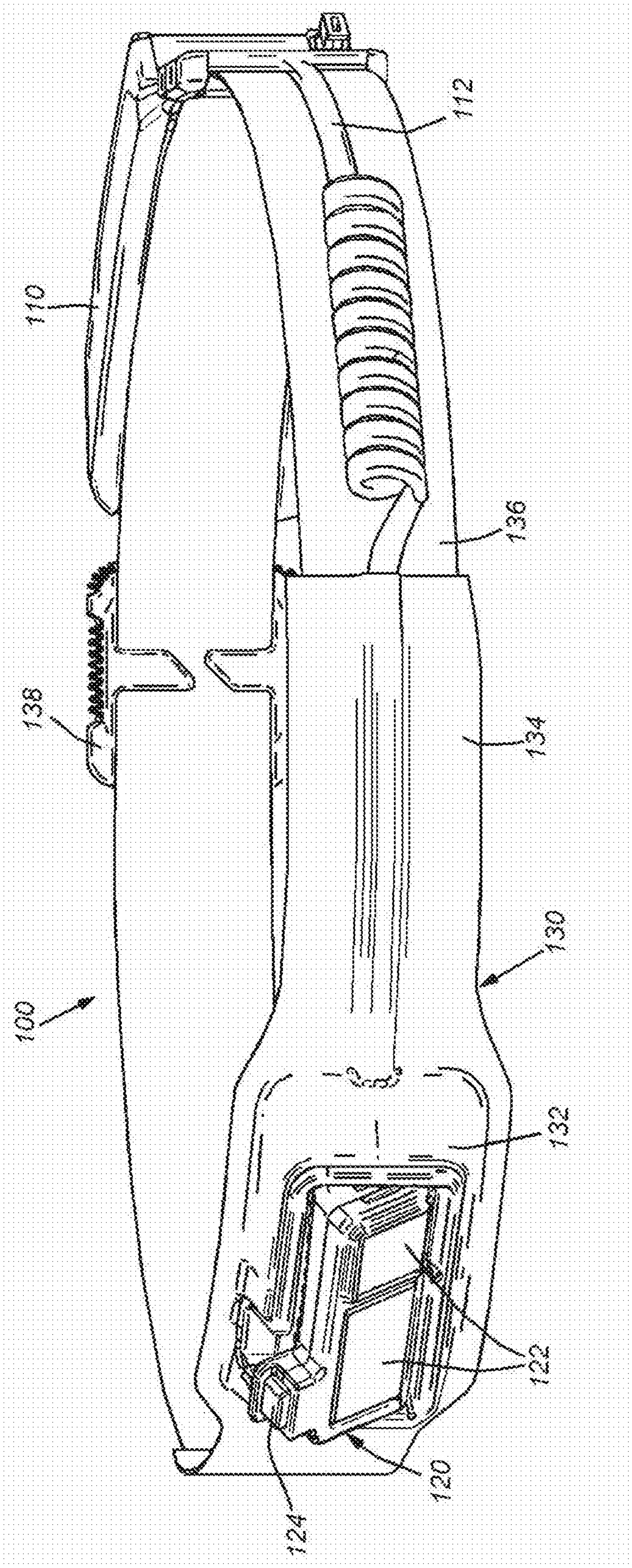
FIG. 1 is a perspective view of a headlamp, according to an illustrative embodiment.

FIG. 1 is a perspective view of a headlamp, according to an illustrative embodiment. The headlamp of FIG. 1 can have a composite construction with a smooth transition between rigid lamp housing and a flexible band. This composite construction results in a more integrated and streamlined headlamp that can be more comfortable on the head, and can allow the weight to be better supported and better balanced. A headlamp 100 can have a battery pack 110, a lighting system 120, and a support system 130. The battery pack 110 can provide power to the lighting system 120, and by way of non-limiting example can contain at least one rechargeable battery such as a Li-Ion or Li-Polymer battery, or at least one non-rechargeable battery such as an alkaline battery. Locating the battery pack 110 away from the lighting system 120 can decrease the weight of the lighting system 120 as compared to prior art lighting systems that carry the battery within or near the lighting system. This can allow the headlamp to be better balanced and more comfortable. Although the battery pack is depicted as being at the back of the support system, in various embodiments it could be located at different places around the band including the sides. The battery pack 110 can be affixed to or otherwise supported by the support system 130 at a location remote from the lighting system 120. The battery pack 110 can be connected to the lighting system by a power cord 112 that can be fully encapsulated or partially encapsulated within the support system 130.

A lighting system 120 can have one or more lenses 122, and can have one or more light sources, such as LEDs, behind the one or more lenses. Light sources can be grouped into sets and/or subsets, and can have different colors and/or different intensities associated with the sets and/or subsets. Different light sources and/or groups of light sources can be supplied with different power levels (e.g., different voltages and/or currents from the batter pack 110 or other power source) and/or coupled to different optical lenses 122. A lighting system 120 can have a button 124 that can be used to operate the lighting system 220, such as change operational modes, and/or turn one or more of the light sources on or off.

A support system 130 can include a lamp housing 132 and a support band 134. In various embodiments, the support system 130 can have and at least one strap 136. The strap 136 can be a substantially elastic or other flexible material that can be a fabric and can be stretchable. In various embodiments a support system 130 can be free of a strap, and the support band 134 can be adapted to encircle at least a portion (e.g., a front portion or a forehead) of the head of a user, and can be held in place by an elastic nature of the support band. In various embodiments, flexible portions of the headlamp, such as a strap 136 and/or support band 134 can be attached to or routed through adjustment buckles 138 that can be used to adjust the circumference of the headlamp. The support band 134 can be made from one or more layers of support members that can be adhered around a lamp housing to create a composite support structure. The lamp housing 132 can be partially or entirely held within the support band 134, and the support band 134 may fully obscure the lamp housing. The integrated composite construction can be achieved by compressing layers of flexible support members around the rigid lamp housing 132, explained more fully below.

Figure 2:
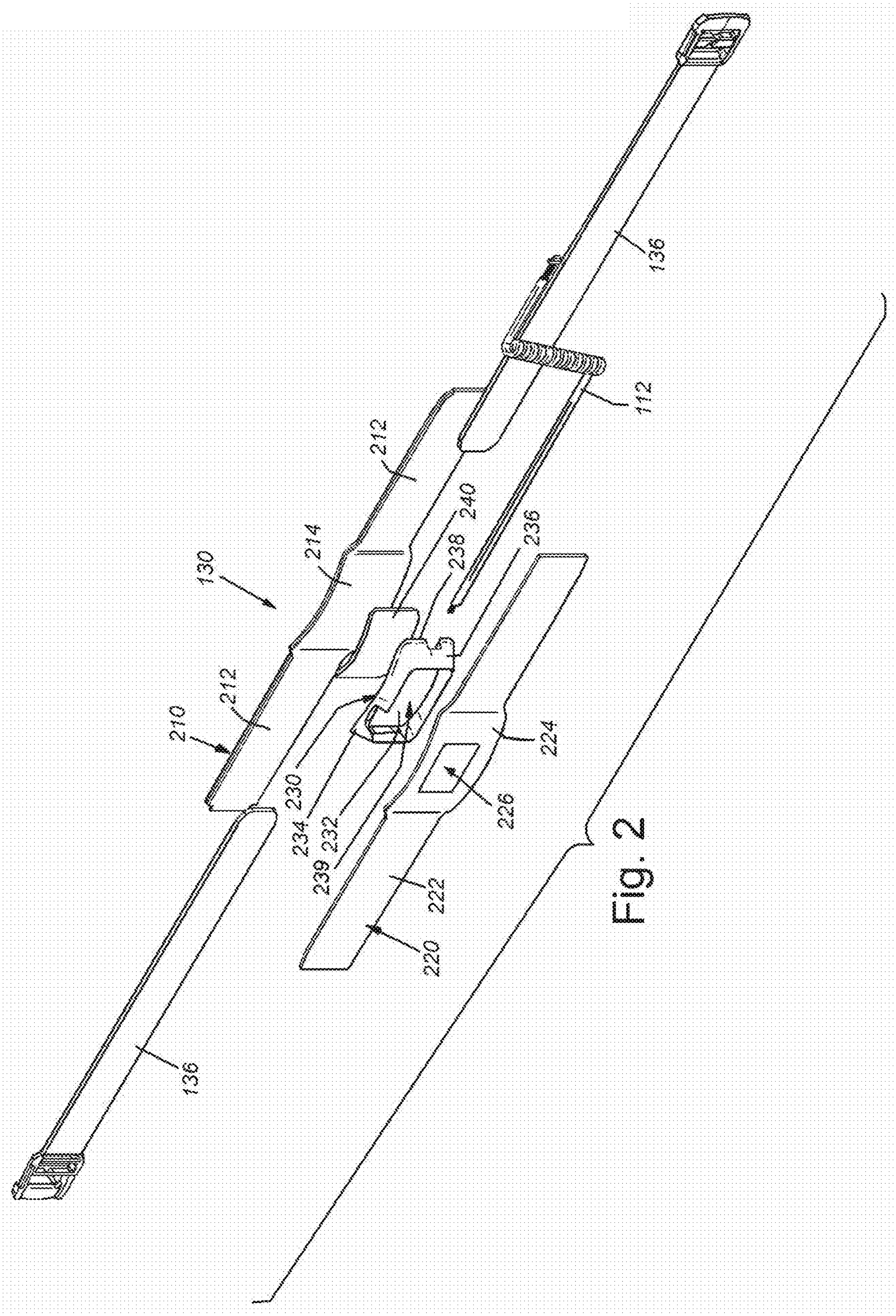
FIG. 2 is an exploded view of a support system of the headlamp shown in FIG. 1, according to an illustrative embodiment.

FIG. 2 is an exploded view of a support system of the headlamp shown in FIG. 1, according to an illustrative embodiment. The support system 130 can have an inner support member 210, an outer supper member 220, and an outer lamp housing 230. The support system 130 can have a layer of resilient material 240 that can be between the inner support member 210 and the outer lamp housing 230. The support system can also include one or more straps 136, and the support system can at least partially contain a power cord 112. The inner support member 210 and the outer support member 220 can be adhered to each other with the power cord 112 between them, so that the power cord 112 can be held between the inner and outer support members. The inner support member 210 can have wings 212 and a base 214. The outer support member 220 can have wings 222 and a base 224, and the base 224 can have a housing hole 226. The housing hole 226 can be variable in size, and can have flaps, rounded corners, or other variations, described more fully below. In various embodiments, the outer support member 220 can be free of a housing hole 226. The outer lamp housing 230 can have a foundation 232, a brim 234, and a frame 236. The frame 236 can be one or more sidewalls 238 extending upward from the foundation 232. The outer lamp housing 230 can have a cavity 239 that can be defined by the foundation 232 and the frame 236. The brim 234 can be a projecting edge extending outward around at least a portion of the circumference of the outer lamp housing 230. As used herein the directional terms, such as, but not limited to, “up” and “down”, “upward” and “downward”, “rear”, “rearward” and “forward”, “top” and “bottom”, “inside” and “outer”, “front” and “back”, “inner” and “outer”, “interior” and “exterior”, “downward” and “upward”, “horizontal” and “vertical” should be taken as relative conventions only, rather than absolute indications of orientation or direction with respect to the acting direction of the force of gravity.

In various embodiments, the outer lamp housing can be made from a substantially rigid plastic, and the support members 210 and 220 can be made from a substantially flexible material that have a greater flexibility than the rigid plastic. The rigid material of the outer lamp housing can be a hard plastic that can maintain a fixed shape and can engage with and secure the lighting system 120. The flexible material of the support members can be a textile or other fabric material. The flexible material can be a stretchable material. The flexible material can be a synthetic fiber such as an elastic polyurethane fiber, including elastane or spandex. The flexible material can be various microfiber polyesters, nylon rip stop, PTFE, or other materials. The flexible material of the support members can be materials that provide water resistance, UV protection, odor protection, and/or moisture wicking properties. The flexible material of the support members can be impregnated or coated with an adhesive such as a thermally activated adhesive. The rigid components of the headlamp, including the lamp housing and the outer case of the lighting system can be made from hard plastics such as ABS, nylon, polycarbonate, polypropylene, or polyethylene. The resilient material 240 can be a substantially soft or compressible material that can be one or more layers of silicone, foam polymer, and/or thermoplastic polyurethane (TPU) material. The resilient material 240 can be between the flexible inner support member 210 and the rigid outer lamp housing 230 and can act as a transition between the rigid and flexible layers of the composite structure. The resilient material 240 can be a thicker layer than the flexible inner support member 210 or flexible outer support member 220. The flexible material of the inner and outer support members 210 and 220 can be more stretchable than the resilient material 240. In various embodiments, the resilient material 240 can be applied to, placed around, or placed near various rigid parts of the assembly, including the foundation 232, the brim 234, and/or the frame 236. The resilient material can provide cushioning and can enhance the fit and comfort on the head of the user.

Figure 3A:
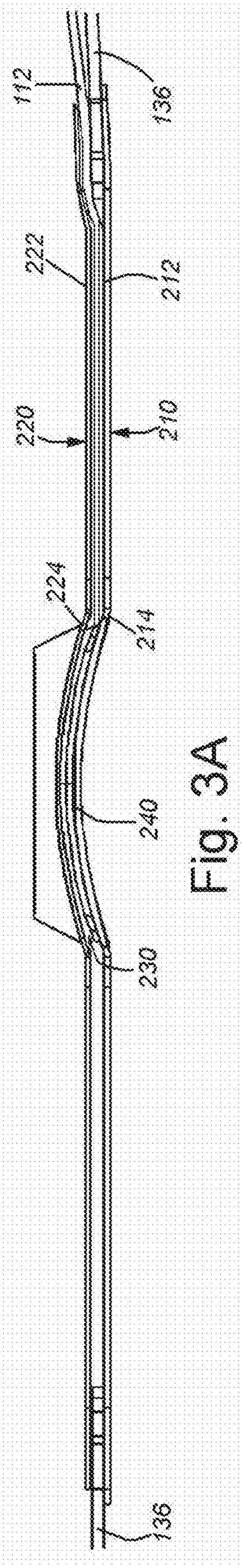
FIG. 3A is bottom view of the partially assembled support system of FIG. 2, according to the illustrative embodiment.

FIG. 3A is bottom view of the partially assembled support system of FIG. 2, according to the illustrative embodiment. The headlamp can be constructed by placing the outer lamp housing 230 between the inner support member 210 and the outer support member 220. One or more layers of resilient material 240 can be located between the outer lamp housing 230 and the inner support member support member 210, and in various embodiments one or more layers of resilient material 240 can be located between the outer lamp housing 230 and the outer support member 220. As shown in FIG. 3A, the outer support member 220 can be free of a housing hole 226, and the flexible material of the outer base 224 of the outer support member 220 can be stretched over and around the outer lamp housing, and the brim can be sandwiched between the bases 214 and 224. In various other embodiments, the outer support member can have a housing hole, and the frame 236 can be inserted through the housing hole of the outer support member, so that the cavity 239 is not covered by the outer support member.

Figure 3B:
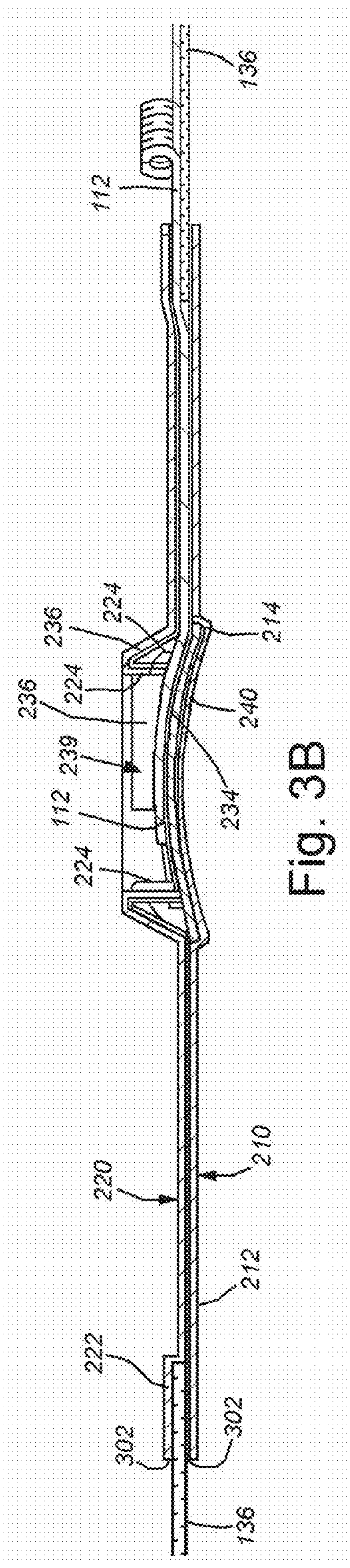
FIG. 3B is an exposed bottom view of a fully assembled support system of FIG. 3A, showing interior details, according to an illustrative embodiment.

FIG. 3B is an exposed bottom view of a fully assembled support system of FIG. 3A, showing interior details, according to an illustrative embodiment. Heat and pressure can be applied to the partially assembled support system shown in FIG. 3A to create the fully assembled support system shown in FIG. 3B. The inner and outer support members 210 and 220 can substantially encapsulate the rigid outer lamp housing 230 and resilient member 240. The flexible support members 210 and 220 can be compressed around the rigid outer lamp housing 230 under heat and/or pressure in the presence of an adhesive to securely hold the rigid outer lamp housing 230 and form a composite structure. The composite structure can include flexible support members 210 and 220, the outer lamp housing 230, and the resilient member 240. The flexible material of the support band can extend beyond the rigid material to form a combination of flexible and rigid regions of the composite structure. The outer support member 220 can be secured to the brim 234 and the frame 236 of the outer lamp housing 230, and to the inner support member 210. The inner support member 210 can be secured around the resilient member 240, the foundation 232, and the brim 234 of the outer lamp housing 230, and to the outer support member 220.

The perimeter around the brim 234 can be smaller than the perimeter around the bases 214 and 224, or put another way, the bases 214 and 224 can have widths and lengths that are at least as large at the width and length of the outer lamp housing 230. The brim being smaller than the inner base 210 allows the edges of the bases 214 and 224 to seal to each other around the brim and securely hold the outer lamp housing between the support members 210 and 220. The brim 234 can help to smooth the transition at the connection between the rigid outer lamp housing 230 and the flexible support members 210 and 220. The edges of the bases sealing to each other and encapsulating the brim can also increase comfort to the user by preventing the rigid outer lamp housing from contacting the user.

The base 224 of the outer support member can be stretched and/or compressed into the cavity 239, so that the cavity 239 can be lined with a layer of flexible outer support member 220 and the outer lamp housing 230 can be encapsulated by the support members 210 and 220. The outer support member 220 can be pressed into the cavity 239, and adhesive can secure the outer support member 220 to the foundation 232 and sidewalls 238 of the cavity. The adhesive can be heat activated, and the heat and pressure can be applied together to seal the inner support member 210 and the outer support member 220 around the outer lamp housing 230, the resilient member 240, and the power cord 112.

Securing power cord 112 within the support members 210 and 220 can prevent the power cord from being snagged on other objects while the user is wearing the headlamp. The power cord 112 can extend from the battery pack 110, through the support band 134, through the outer lamp housing, into the cavity 239, and into the lighting system 120, so that it can supply power to the lighting system 120.

In various embodiments, the support band 134 can include more than two layers of material. The inner support member 210 and/or the outer support member 220 can have two or more layers of material. In various embodiments, a support system with more than two layers can be assembled and adhered together at one time. In various embodiments, one or more additional layers can be added to a support system consecutively. More than two layers of material in the support band 134 can increase the resilience, strength, and/or comfortableness of the headlight.

In various embodiments, one or more strap 136 can be sandwiched between the inner support member 210 and outer support member 220. The support members 210 and 220 can be adhered to the one or more straps 136 and can hold the one or more straps 136 securely between the support members 210 and 220. The inner and outer support members can be secured around the strap 136 through heat and/or pressure.

The method of construction described herein can be applied using a wide range of fabrics or other flexible materials. The specific properties of the composite structure can be tailored by using one or more different types of material in the composite. By way of non-limiting example, in an embodiment the composite structure can be formed by layers of spandex, elastic, and plastic. The spandex can provide a breathable, semi-flexible, quick drying support member portion of the composite, while the elastic can provide the high flexibility strap region, and the plastic can form the rigid housing for the lamp electronics. In various embodiments, resilient material that can be one or more layers of silicone, foam polymer, and/or thermoplastic polyurethane (TPU) material that can be applied around the rigid parts of the assembly, and can act as a transition between the rigid and flexible layers of the composite structure. The resilient material can provide cushioning and can enhance the fit and comfort on the head of the user, and can also help to smooth the transition between the rigid lamp housing and the flexible support members. Heat resistant resilient materials, such as silicone, foam polymer, and/or TPU, can be used to avoid melting or deformation of the resilient material under the heat and pressure that can be used in manufacturing.

Figure 4:
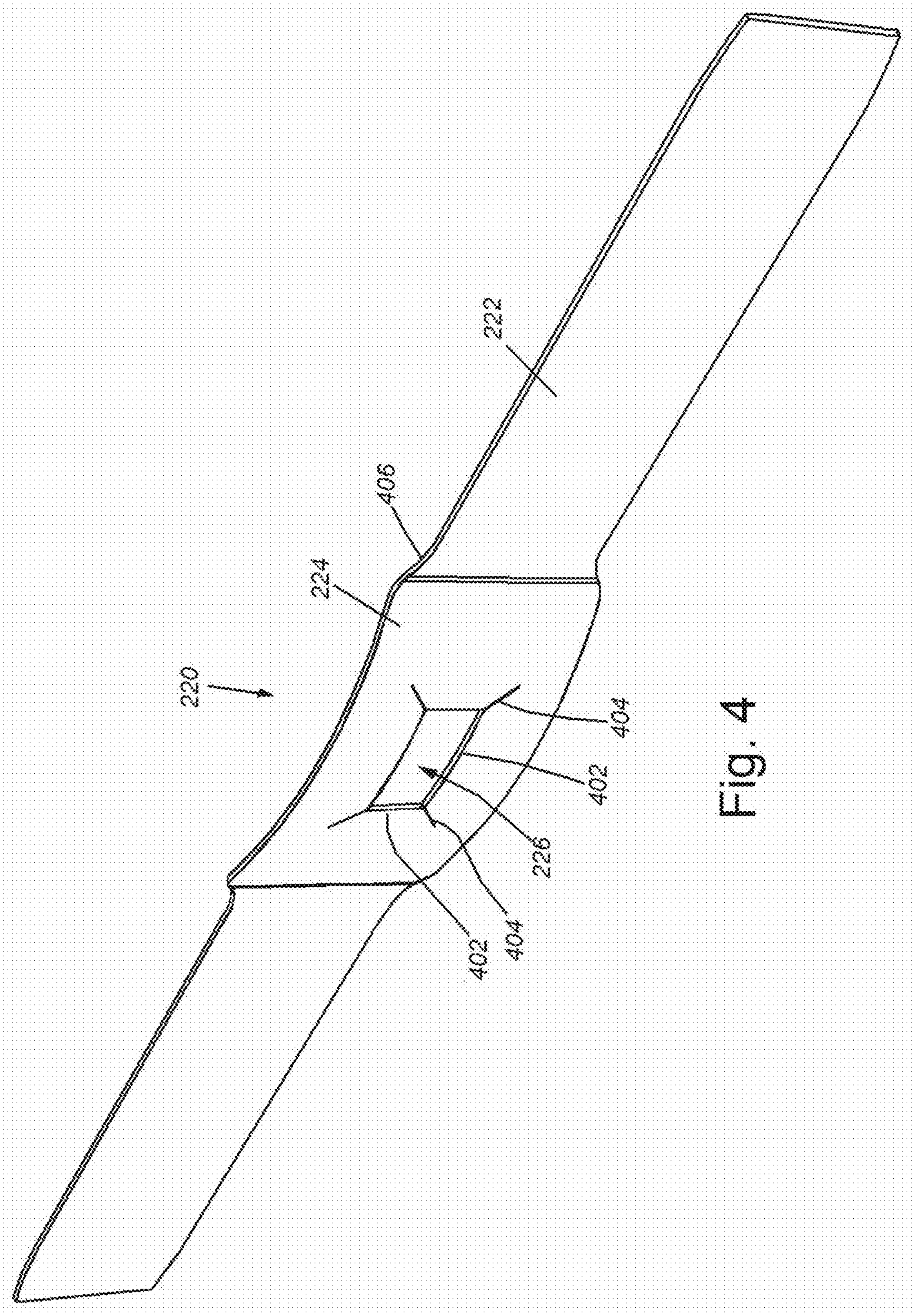
FIG. 4 is a perspective view of an outer support member of the support system of FIG. 2, according to an illustrative embodiment.

FIG. 4 is a perspective view of an outer support member of the support system of FIG. 2 with a housing hole, according to an illustrative embodiment. The outer support member 220 can have wings 222 and a base 224, and the base 224 can have a housing hole 226. Housing hole 226 can have flaps 402 and/or slits 404. The outer support member 220 can overlay the outer lamp housing, and the housing hole can be aligned with a cavity of the lamp housing, explained more fully below. The outer lamp housing can be inserted through the housing hole 226, or the inner support member 220. When the outer lamp housing is inserted through the housing hole 226, the flaps 402 can lay against the sidewalls of the outer lamp housing and can help to secure the outer support member 220 to the lamp housing after the outer support member is adhered to the outer lamp housing. Slits 404 can allow the outer support member to conform and/or stretch around the outer lamp housing. Flaps 402 and slits 404 can be various shapes and sizes depending on the materials used in construction. In various embodiments, the flaps 402 and slits 404 can be constructed and arranged to partially or entirely encapsulate the outer lamp housing when the outer support member is adhered to the outer lamp housing. In various embodiments, the cavity may not be fully covered by the support members, or the cavity may not be covered at all by the support members. In other various embodiments, the outer support member 220 may be free of a housing hole, and the flexible material of the outer support member can encapsulate the outer lamp housing and can cover the interior of the cavity. The flexible outer support member 220 can stretch and be pressed into place against the interior of the cavity of the lamp housing. The wings 222 can be narrower than the base 224, and can have a transition area 406 that can slope and/or curve from the base 224 to the wings 222. Wings 222 that are narrower than the base 224 can allow the brim of the lamp housing to be encapsulated within the bases while having wings 222 that can be more comfortable to the wearer.

Figure 5A:
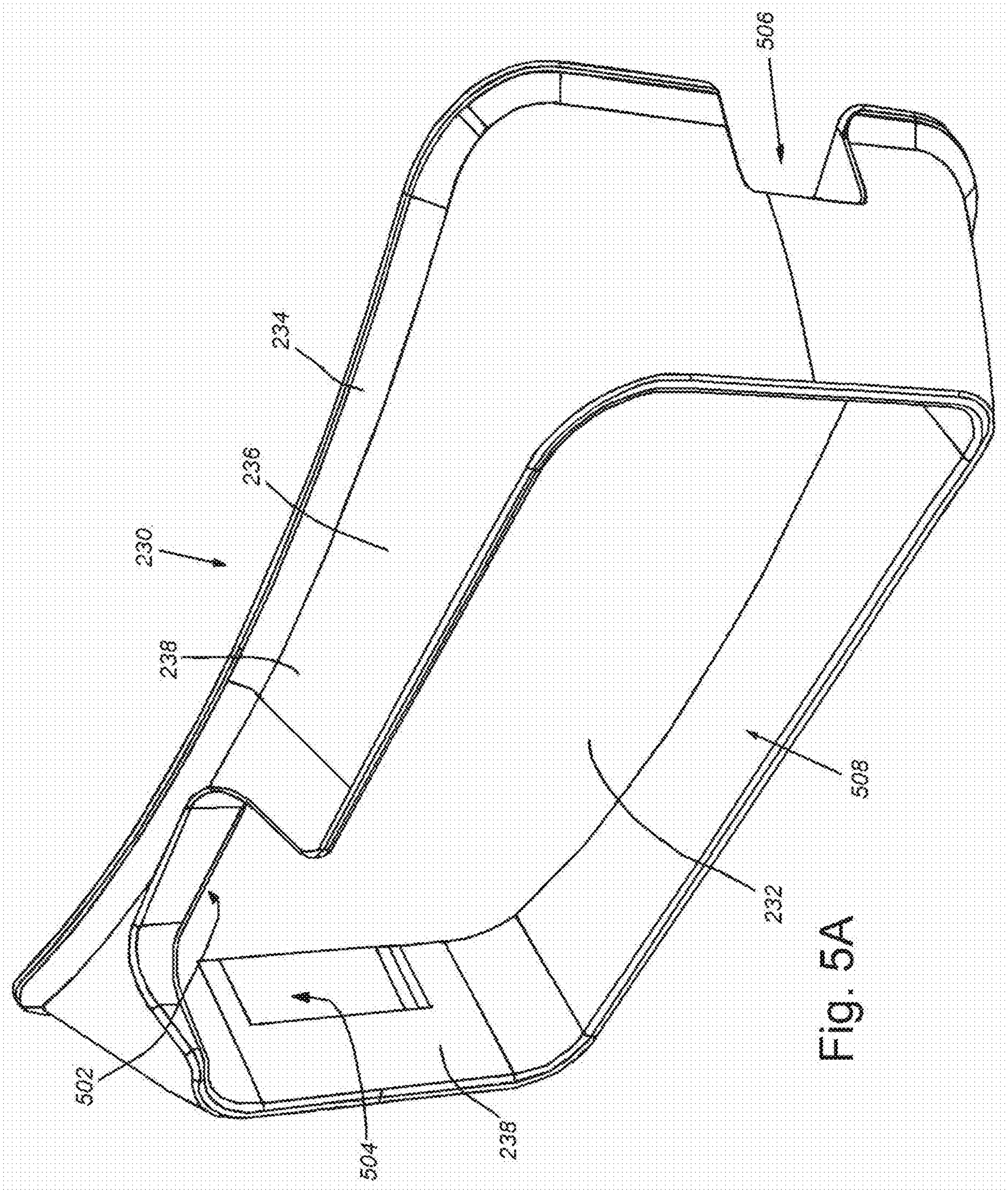
FIG. 5A is a perspective view of an outer lamp housing of the support system of FIG. 2, according to an illustrative embodiment.
Figure 5B:
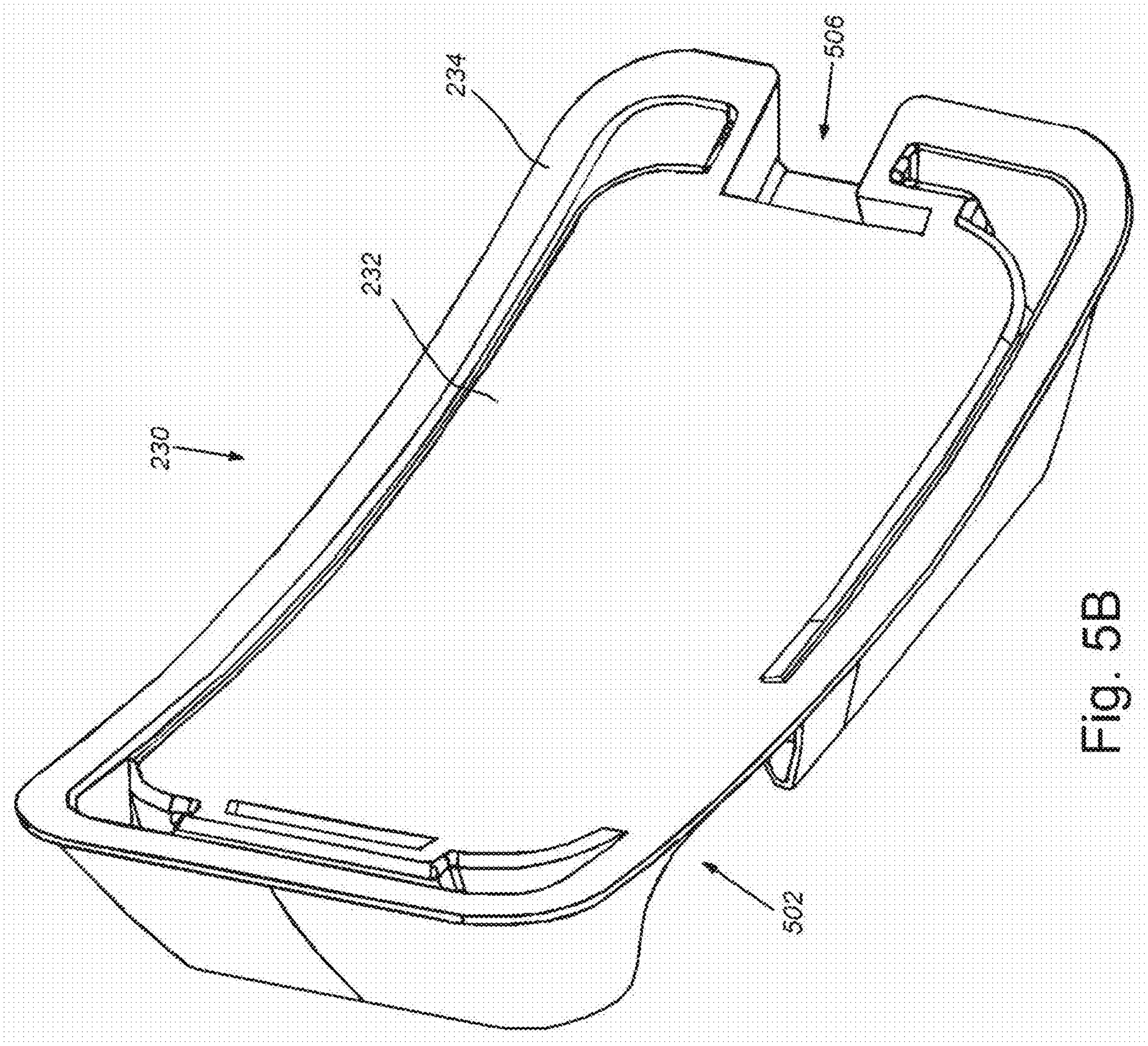
FIG. 5B is a second perspective view from a different perspective of the outer lamp housing of the support system of FIG. 2, according to an illustrative embodiment.

FIG. 5A is a perspective view of an outer lamp housing of the support system of FIG. 2, according to an illustrative embodiment. An outer lamp housing 230 can have a foundation 232, a brim 234, and a frame 236 that can have sidewalls 238. The frame 236 can have an outer notch 502 that can allow access to the button 124, and can allow the user to adjust the angle of the lighting system, explained more fully below. The interior of the frame can have two or more indents 504 that can allow an inner lamp housing to be engaged with the outer lamp housing, explained more fully below. In an embodiment, an outer lamp housing can have two indents 504 that can be on opposing sides of the frame 236. The outer lamp housing 230 can have a power cord channel 506 that can allow the power cord to pass through the side of the outer lamp housing and provide power to the lighting system. The power cord channel can be an opening through the frame 236, brim 234, and/or foundation 232. The foundation 232 and frame 236 can form a cavity 508 that can house a lighting system, or an inner lamp housing that can hold a lighting system. The support members can be adhered to the foundation, the brim, and the frame. The cavity 508 can be free of contact with the support members, which is to say the support members are not in contact with the cavity, are not adhered to the cavity, and do not cover the cavity. In various embodiments, the support members can cover and encapsulate all of the outer lamp housing except the cavity. FIG. 5B is a second perspective view from a different perspective of the outer lamp housing of the support system of FIG. 2, according to an illustrative embodiment. The base of the inner support member can be adhered to the bottom of the foundation 232 and/or the bottom of the brim 234. The power cord that can be held within the wings 212 and 222 can enter the lamp housing through the power cord channel 506.

Figure 6:
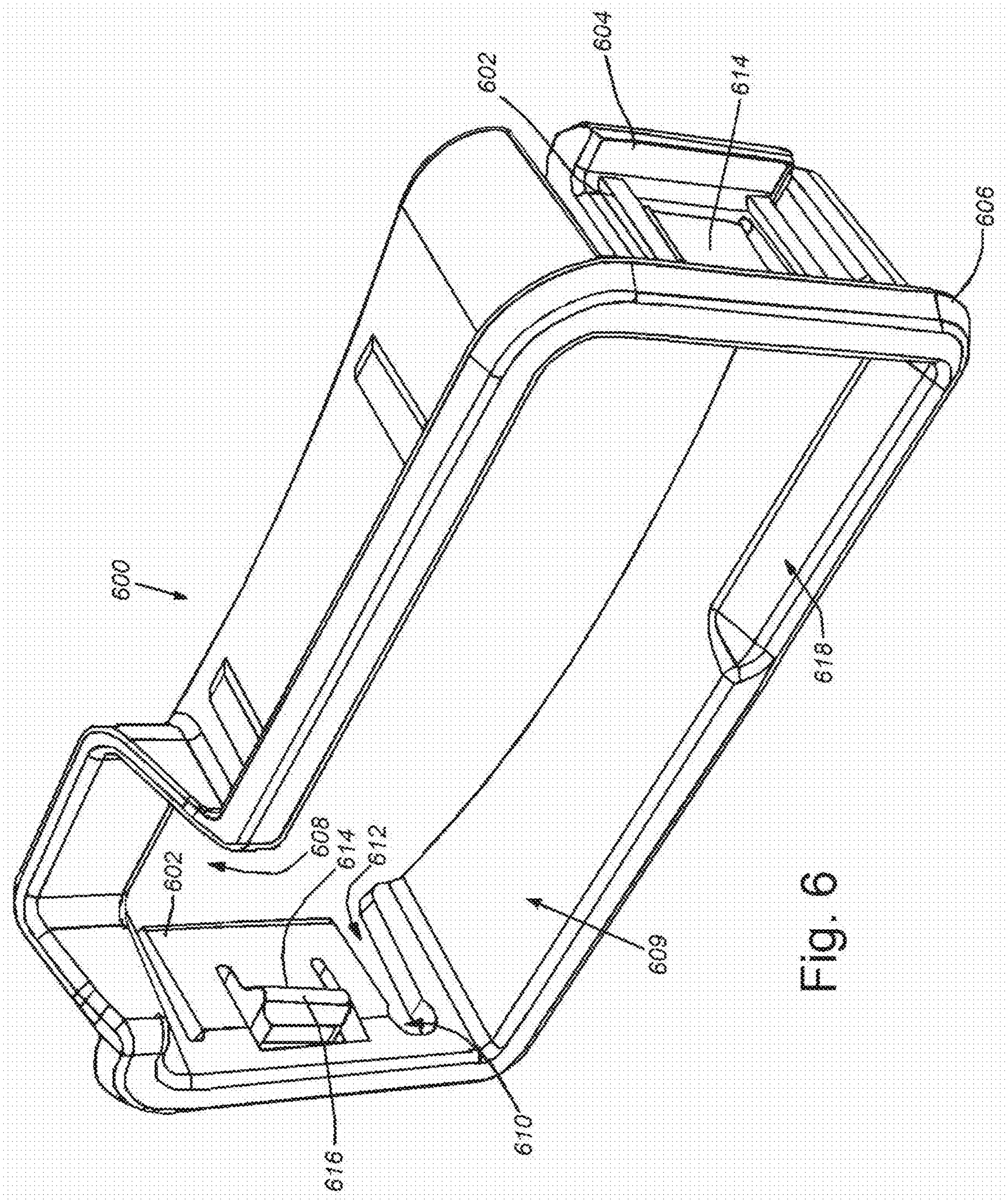
FIG. 6 is a perspective view of an inner lamp housing, according to an illustrative embodiment.

FIG. 6 is a perspective view of an inner lamp housing, according to an illustrative embodiment. An inner lamp housing 600 can be configured to be inserted into and held by the outer lamp housing. The inner lamp housing 600 can have at least two deformable tabs 602 with a hook 604. The inner lamp housing 600 can have hooks that correspond in number and locations to the indents of the outer lamp housing, and a hook 604 can be configured to align with and rest within an indent 504 of the outer lamp housing, so that the engagement of the hooks 604 within the indents can prevent the inner lamp housing 600 from being pulled out of the outer lamp housing. The inner lamp housing 600 can have a lip 606 and an inner notch 608. When the inner lamp housing 600 is inserted into the outer lamp housing, the lip 606 can be seated against the top of the frame, and the inner notch 608 can be seated within the outer notch.

The inner lamp housing can also be configured to hold a lighting system, such as lighting system 120 as shown in the illustrative embodiment in FIG. 1. The inner lamp housing can have a cavity 609 for holding a lighting system. The side of the deformable tab 602 can partially define a socket 610 and a socket channel 612, so that an axle of the lighting system can be held within the socket 610, explained more fully below. The inner lamp housing 600 can have a pair of sockets 610 and socket channels 612 on opposing sides of the housing. The inner lamp housing can have at least one deformable flexor 614 with a tooth 616. The at least one tooth 616 can selectively engage within a plurality of grooves in the lighting system, so that the user can selectively adjust the angle of the lighting system, explained more fully below. The at least one tooth 616 can be two teeth 616 on the same sides of the housing with the sockets 610. A deformable flexor 614 can be partially cut out from a deformable tab 602. In various embodiments, an inner lamp housing 600 can have one or more indentations 618. When the lighting system is fully extended into the last tilted position, at least a portion of the bottom of the lighting system can rest against the indentation 618 so that the lighting system can be prevented from tilting farther.

Figure 7:
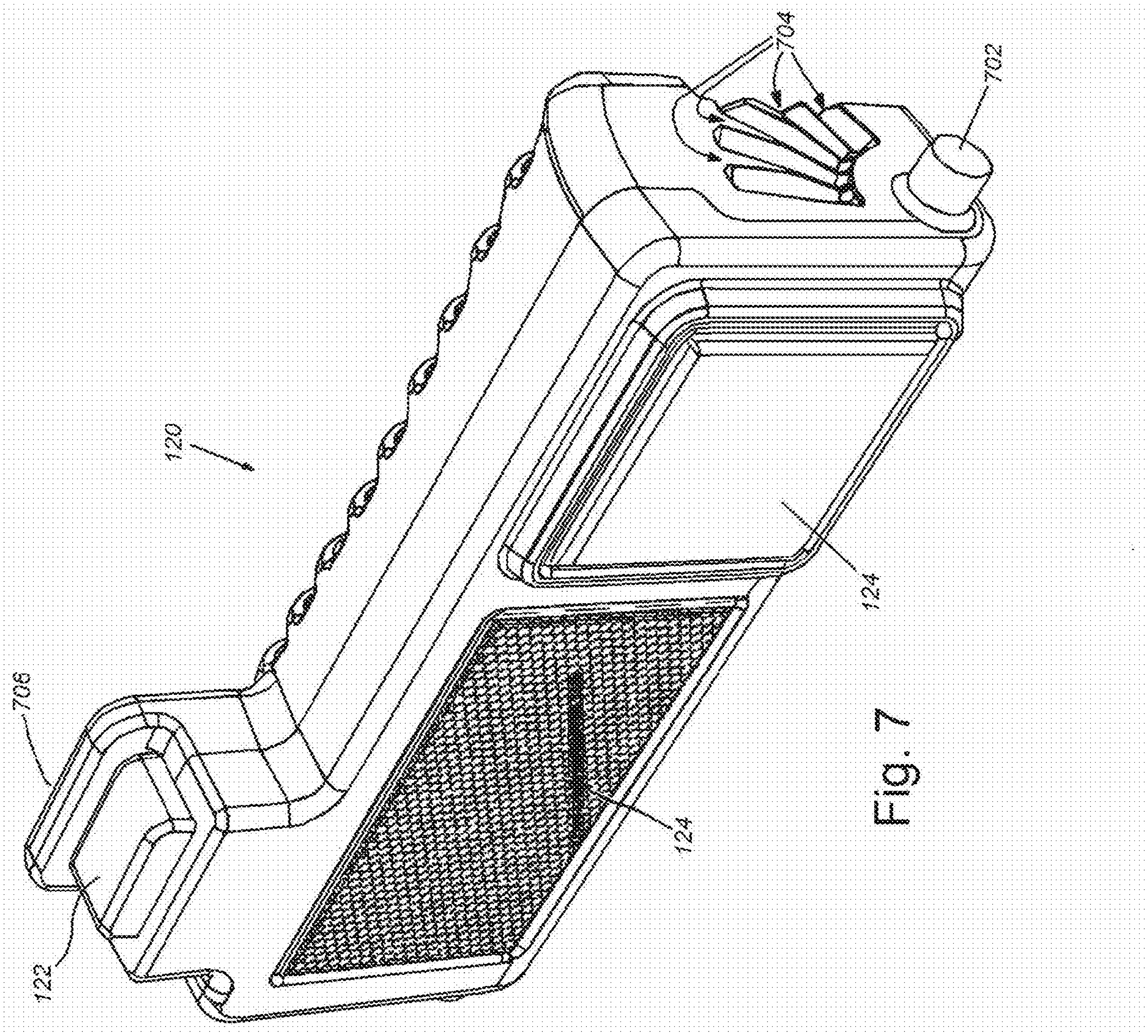
FIG. 7 is a perspective view of the lighting system of the headlamp, according to an illustrative embodiment.

FIG. 7 is a perspective view of the lighting system of the headlamp, according to the illustrative embodiment. A lighting system 120 can have an outer case 700 that can house electronics and at least one light source. The outer case 700 can have a pair of opposing axles 702 that can be extensions from the sides of the case 700. The axles 702 can be in locations on the case 700 that correspond to the sockets of the housing. The axles 702 can rotate within the sockets, thereby forming a hinge that allows the lighting system to be pointed in a range of angles that can include downwards at the ground in front of the user and straight ahead in front of the user.

Manufacturing of the headlamp can include inserting the lighting system 120 into the inner housing 600 by inserting the axles 702 into the sockets. In various embodiments, the lighting system can be inserted and removed through the front of the inner housing. In various embodiments, the lighting system 120 can be inserted into the back of the inner housing 600, and the axles 702 can be passed through the socket channels 612 until they are engaged within the sockets 610. The deformable tabs of the inner lamp housing 600 can flex or deform slightly to allow the axles to pass through the socket channels and be secured within the sockets.

The angle of the lighting system 120 relative to the inner lamp housing can be tilted by pivoting the lighting system 120 on the axles 702. The outer case can have a plurality of grooves 704 that are configured to be selectively engaged by the at least one tooth of the housing to maintain a desired tilt angle of the lighting system. The outer case 700 can have a grip 706 that can allow a user to manipulate the tilt angle of the lighting system 120. The grip 706 can extend above the notches of the lamp housing, so that the user can engage with the grip 706 and adjust the tilt angle of the lighting system, and the selected angle can be maintained by a tooth within a groove 704. The lighting system can have one or more lenses and/or filters 124, and can have one or more light sources, such as LEDs behind the one or more lenses and/or filters 124. The lighting system can have one or more buttons 122 that can turn the light(s) on, select between groups of light sources, change lighting modes, intensities, or colors, and/or turn the light(s) off.

Figure 8:
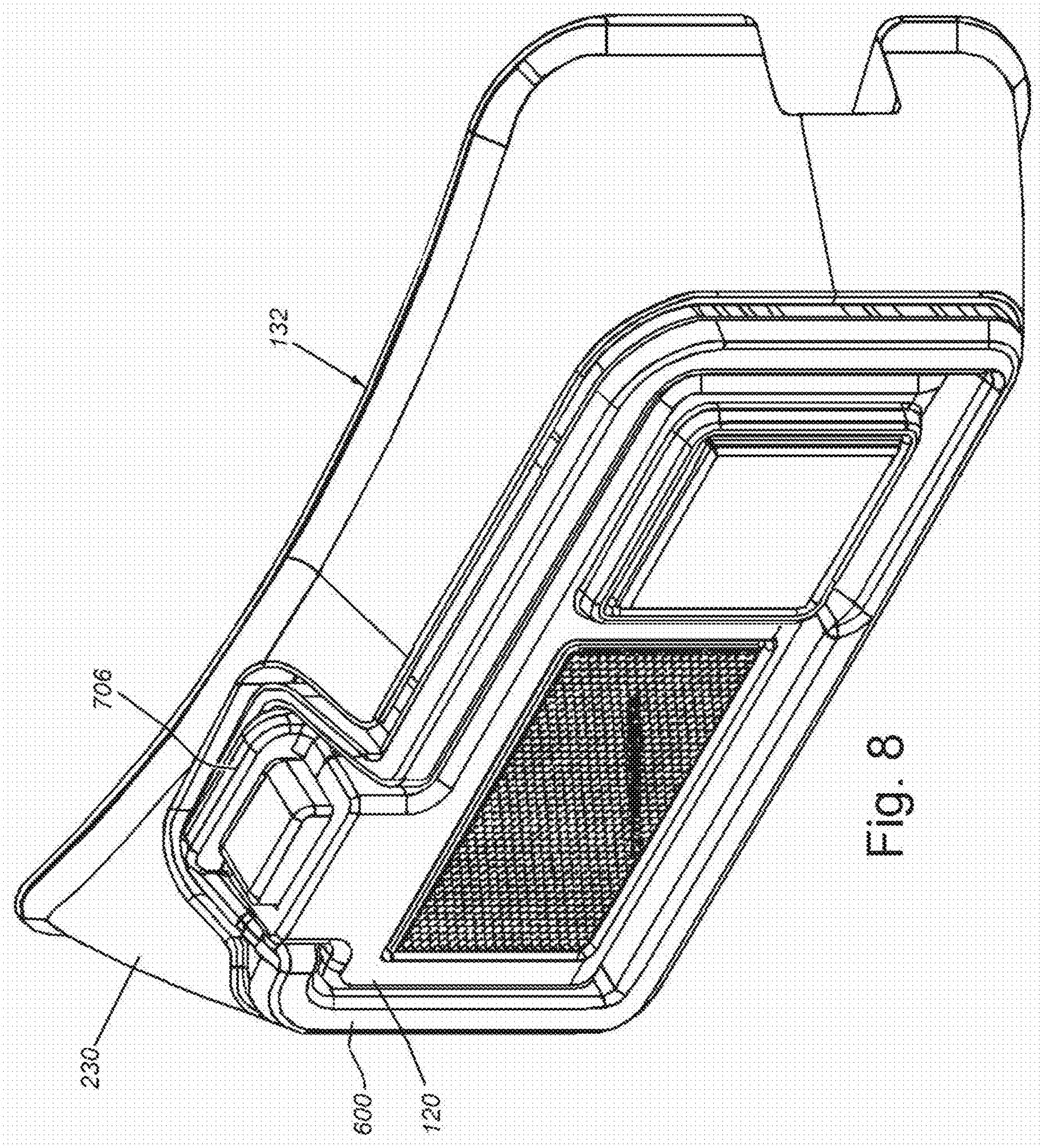
FIG. 8 is an assembled view of the lighting system and lamp housing, according to an illustrative embodiment.

FIG. 8 is an assembled view of the lighting system and lamp housing, according to an illustrative embodiment. The inner lamp housing 600 can be inserted into the outer lamp housing 230 to form the lamp housing 132. The lighting system 120 can be nested within the inner lamp housing 600 that can be nested within the outer lamp housing 230, and the outer lamp housing 230 can be adhered within the support band. After assembly, the inner notch and outer notch can allow the user to access the grip 706 and adjust the tilt angle of the lighting assembly downwards, as shown in FIG. 1. In various embodiments, the lighting system 120 can be removed from the lamp housing by the user, so that the composite structure with the lamp housing and support band can be washed, and the lighting system can be reinstalled into the composite structure by the user after washing.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in various embodiments, various materials can be used to form the composite structure of flexible and rigid materials or multiple buttons can be incorporated to allow control of various functions. Accordingly, this description is meant to be taken only by way of example, and not to otherwise limit the scope of this invention.

What is claimed is:

1. A wearable electric light with a composite structure comprising:

a first flexible support member;

a second flexible support member;

a rigid housing between the first and second flexible members, wherein the first and second flexible support members are adhered to the rigid housing and extend beyond the rigid housing forming a composite structure with rigid and flexible regions; and an electrical light source housed within the rigid housing, the electrical light source having at least one optical lens, wherein the first flexible support member forms an outer layer adapted to face away from a user, and the second flexible support member forms an inner layer adapted to rest against the user, and wherein the second flexible member covers the back of the rigid housing and is adapted to prevent the rigid housing from contacting the user.

2. The wearable electric light of claim 1, wherein the first and second flexible support members are made from a flexible material impregnated or coated with an adhesive.

3. The wearable electric light of claim 1, wherein the first and second flexible support members are made from a flexible polymer, textile or other fabric material.

4. The wearable electric light of claim 3, wherein the flexible material is impregnated or coated with an adhesive that allows the layers of fabric to be joined by application of heat and/or pressure to form the composite structure.

5. The wearable electric light of claim 1, wherein the rigid housing has a foundation, and a frame, and defines a cavity formed by the foundation and the frame, and wherein the first and second flexible support members are adhered to the foundation and sides of the frame (236), and wherein the support members do not fully cover the cavity.

6. The wearable electric light of claim 5, further comprising a brim around a perimeter of the rigid housing.

7. The wearable electric light of claim 1, further comprising a layer of resilient material between the rigid housing and the first and second flexible support members.

8. The wearable electric light of claim 7, wherein the resilient material is silicone, TPU, or foam polymer.

9. The wearable electric light of claim 1, wherein the band further comprises a strap.

10. The wearable electric light of claim 1, wherein a battery is supported by the band remote from the rigid housing.

11. The wearable electric light of claim 10, wherein a power cord connecting the battery to the electric light source is at least partially held between the first flexible support member and the second flexible support member.

12. A wearable electric light with a composite structure comprising:

a first flexible support member;

a second flexible support member;

a rigid housing mounted relative to the first and second flexible members, wherein the first and second flexible extend beyond the rigid housing forming a composite structure with rigid and flexible regions;

an electrical light source housed within the rigid housing, the electrical light source having at least one optical lens, wherein the first flexible support member forms an outer layer adapted to face away from a user, and the second flexible support member forms an inner layer adapted to rest against the user, and wherein the second flexible member covers the back of the rigid housing and is adapted to prevent the rigid housing from contacting the user; and a battery supported by the band remote from the rigid housing, wherein a power cord connecting the battery to the electric light source is at least partially held between the first flexible support member and the second flexible support member.

13. A method of constructing a wearable electric light with a composite structure, the method comprising:

placing a rigid housing defining a cavity between a first layer of flexible material and a second layer of flexible material, at least one of the first layer of flexible material and second layer of flexible material having wings that extend outwards beyond the rigid material; and compressing the two layers of flexible material to form a composite structure, wherein the first flexible support member forms an outer layer adapted to face away from a user, and the second flexible support member forms an inner layer adapted to rest against the user, and wherein the second flexible member covers the back of the rigid housing and is adapted to prevent the rigid housing from contacting the user.

* * * * *